United States Patent [19]

Goins

[11] Patent Number: 5,052,254
[45] Date of Patent: Oct. 1, 1991

[54] LATHE JAW SECURING DEVICE

[76] Inventor: Glen R. Goins, 3810 Glen Willow Way, Louisville, Ky. 40299

[21] Appl. No.: 469,037

[22] Filed: Jan. 23, 1990

[51] Int. Cl.$^5$ .............................................. B23B 31/12
[52] U.S. Cl. .................... 82/152; 279/1 SJ; 279/1 L; 33/644; 51/259
[58] Field of Search ............ 279/1 R, 1 L, 1 SJ, 279/110, 1 ME; 51/259; 33/644, 563; 82/152

[56] References Cited

U.S. PATENT DOCUMENTS

| | | | |
|---|---|---|---|
| 156,235 | 10/1874 | Pratt | 411/136 |
| 224,448 | 2/1880 | Larson | 411/136 |
| 515,089 | 2/1894 | McClelland | 411/533 X |
| 827,562 | 7/1906 | Pollock | 411/136 |
| 2,925,282 | 2/1960 | Borsetti | 279/1 SJ |
| 3,083,796 | 4/1963 | Bell, Jr. | 411/533 X |
| 3,104,474 | 9/1963 | Rehart | 51/259 |
| 3,156,480 | 11/1964 | Wuesthoff | 279/1 L |
| 3,747,945 | 7/1973 | Bailiff | 279/1 SJ |
| 3,945,654 | 3/1976 | McMullen | 279/123 |
| 4,041,612 | 8/1977 | Skubic | 279/1 LX |
| 4,530,508 | 7/1985 | Ferraro | 279/123 |
| 4,772,034 | 9/1988 | Brown | 279/1 SJ |

FOREIGN PATENT DOCUMENTS

| | | | |
|---|---|---|---|
| 1295976 | 5/1969 | Fed. Rep. of Germany | 279/1 R |
| 656092 | 4/1989 | France | 279/1 SJ |

Primary Examiner—Larry I. Schwartz
Assistant Examiner—Robert Schultz
Attorney, Agent, or Firm—Edward M. Steutermann

[57] ABSTRACT

An arrangement to retain jaws of a lathe chuck assembly against movement which includes an annular securing ring having a central opening with a diameter generally equal to the outer diameter of the chuck assembly and where the lathe chuck includes radially removable jaw members and where the securing ring includes feet located to engage the jaw members when then are in position in the lathe chuck housing to prevent outward movement thereof where the lathe jaw chuck members have cooperative fastening means to hold soft jaw members thereto.

1 Claim, 2 Drawing Sheets

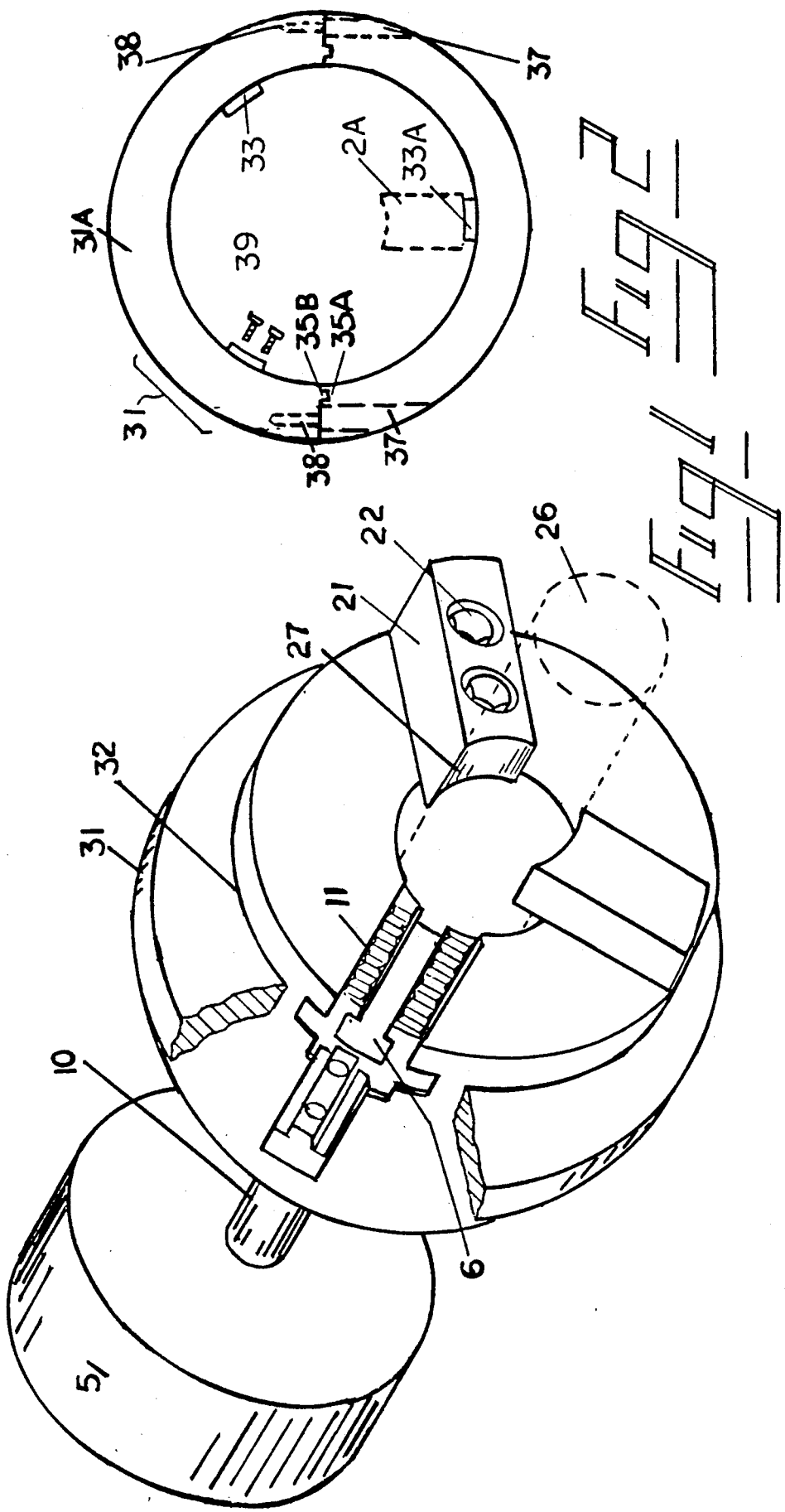

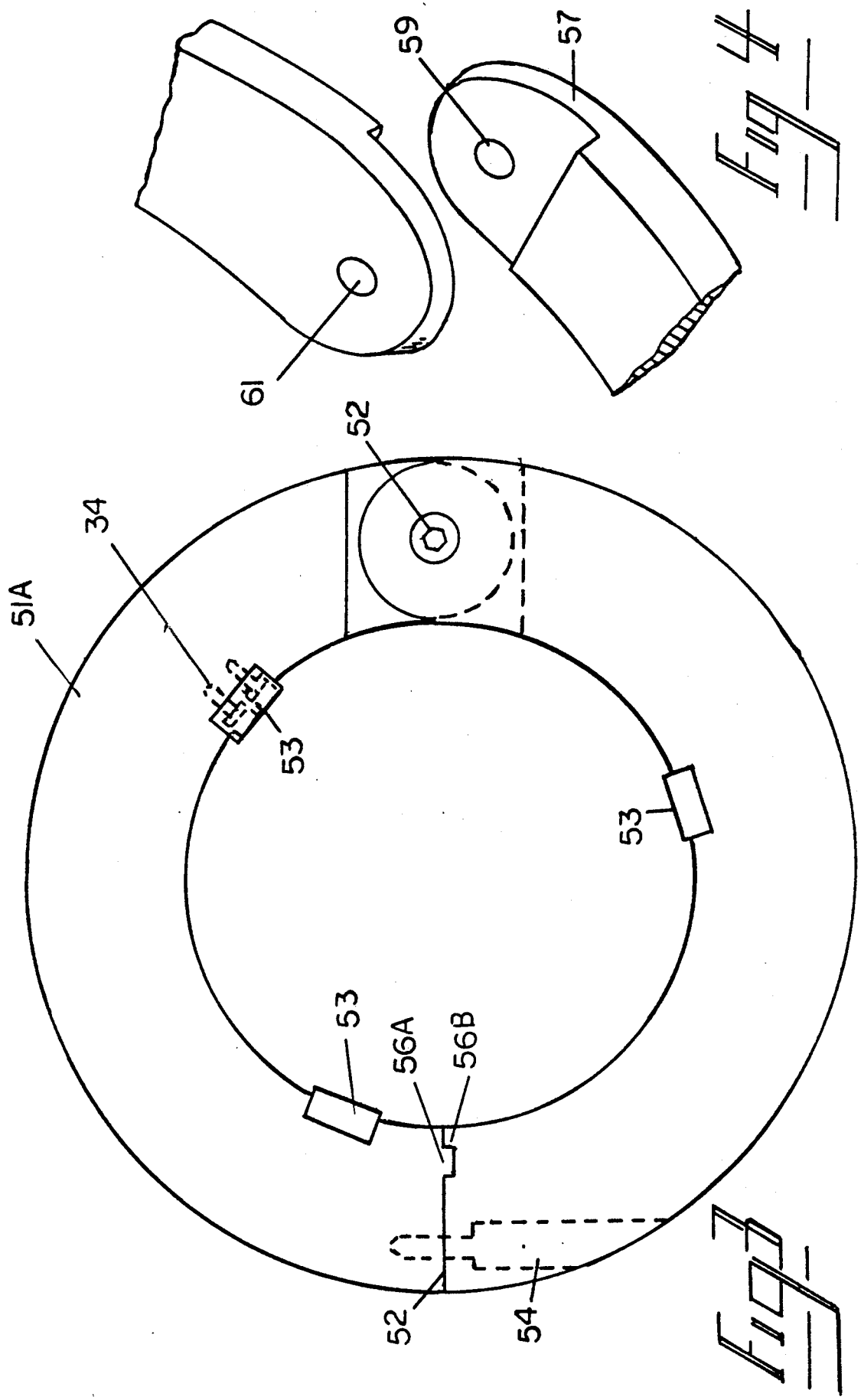

LATHE JAW SECURING DEVICE

BACKGROUND OF THE INVENTION

The present invention relates, in general, to lathe devices and more particularly relates to attachments for positioning work by soft jaws that attach to each of the jaws of the lathe chuck. The lathe chuck jaws are restricted to prevent movement of the assembly. Soft jaws are refabricated of readily machinable materials and are used in industry for machining operations where concentricity and runout tolerance is critical for a part being machined. Soft jaws are usually machined to mate with various types of chucks normally used in a lathe assembly. The soft jaws are fitted on the chucks of a device such as a lathe or grinder and formed in place by machining to the desired gripping diameter for the part that is to be machined. Once machined with the gripping surfaces properly formed, the soft chuck jaws fit the particular lathe chuck for which they have been designed and then the concentricity of the part to be machined is ensured.

In connection with the manufacture of soft jaws the principal cost arises from the various configurations which may be from time to time utilized for locating the work piece in the jaws.

Various prior art procedures have been devised to shorten setup time and accurately position the work piece. In one arrangement alignment is achieved by individually adjusting each lathe soft jaw radially back and forth until the work piece is positioned positively in the intended location. Such a procedure is time consuming and expensive and results of course in lost production time.

Various prior art arrangements have been developed to address the problems associated with the manufacture and use of soft jaws and include U.S. Pat. Nos. 4,746,131; 4,696,482; 4,556,228; and 4,277,073 in addition, various manufactures produce devices of various configurations directed to a similar purposes and include Huron Machine Products Inc., as well as Accuring Jaw Systems Inc., of Ambler, PA.

However, no prior art arrangement is known which provides the advantageous of devices within the scope of the present invention is described hereinafter.

SUMMARY OF THE INVENTION

The present invention provides a new, useful, and highly effective means for positioning the soft jaws for accurate machining of metal parts. Devices within the scope of the present invention are particularly useful in that the devices can be easily fabricated and attached to the lathes without loss of concentricity or dimensional features. Further devices within the scope of the present invention provide a means where there is no interference by the holding device so that the lathe can be used to turn outer diameters bore internal diameters or face the soft jaw.

Specifically, devices within the scope of the present invention include a ring located around the outer periphery of the lathe jaw chuck assembly and feet are provided to engage the radially movable jaws of the lathe assembly. The jaws are then moved to their outermost position abutting the feet of the adjusting ring.

At this point with the soft jaws attached to each of the lathe chuck jaws a cut can be taken in the bore of the soft jaw members to define the true center and location for insertion of the materials to be machined. Also machining operations can include internal or external diameters or for facing.

The ring device and jaws can then be removed from the lathe and can in some cases be reattached at a future time for future production runs.

Devices within the scope of the present invention are inexpensive relative to competitive prior art devices and are far more accurate and provide more reproducable results than virtually all prior art arrangements.

Briefly, the present invention provides an arrangement to retain the jaw of a lathe chuck against movement which includes an annular ring having a central opening with a diameter generally equal to the outer diameter of the chuck and where the lathe chuck includes radially removable jaw members and where the securing device which includes feet located to appropriately engage the jaw members in position in the lathe chuck housing to prevent outward movement thereof where the lathe jaw chuck members have cooperative aperatures adapted to receive fastening means to hold soft jaw members thereto.

Examples within the scope of the present invention are shown in the accompanying drawings and described hereinafter but it will be understood that various other arrangements also within the scope of the present invention will occur to those skilled in the art upon reading the disclosure set forth hereinafter.

BRIEF DESCRIPTION OF THE DRAWINGS

In the examples in accordance with the present invention shown in the accompanying drawings:

FIG. 1 is a perspective view of an arrangement for use of devices within the scope of the present invention;

FIG. 2 is a elevational view of one arrangement within the scope of the present invention;

FIG. 3 is a plan view of another example of an arrangement within the scope of the present invention; and FIG. 4 is a perspective view of a connecting arrangement useful in the arrangement shown in FIG. 3.

DETAILED DESCRIPTION OF THE DRAWINGS

Referring now to FIG. 1 which illustrates an example of one arrangement within the scope of the present invention, a lathe chuck, of the type commonly known is provided. A master jaw 2 is shown and it is to be understood that in typical applications three master jaws are provided. These also known as "hard jaws" and are constructed in the manner most common to lathe chucks. An operating mechanism is provided which includes a fluid operated cylinder 5 which receives and exhausts fluid by means of conduits to operate a drawbar 10 which axial causes movement of the jaws relative to the chuck as is known in the art. Each of the master jaws is guided for sliding movement relative to the chuck body in ways 6 extending radially to the chuck axis. The cylinder 5 is operated to cause the master jaws to slide along the ways 6 radially with respect to the chuck axis to set the master jaws to hold a work piece in position.

As shown in FIG. 1 the master jaws can each have an associated easily machineable soft jaw 21 mounted thereon and secured thereto for movement with the master jaw as a unit. To secure the soft jaws to the master jaws, bolts 22 are provided and received in drilled and tapped apertures in "T" slot nuts the soft jaws are held to the master jaw by serrated surfaces 11 as shown.

This arrangement provides a simple, but highly efficient means for mounting the soft jaws to hard jaws to work on a workpiece such as the bar 26 shown in the arrangement.

Each of the soft jaws has a bearing surface 27 which has been bored or turned to an internal or external diameter therein with the jaw in place as described hereinafter. Also where required for the work to be performed the jaws can be faced.

In accordance with the present invention a new, useful, and highly efficient means is provided for locating soft jaws for machining to receive a part of the type shown in FIG. 1. In some cases when the soft jaws have been removed they can be easily replaced on the hard jaws and realigned to receive the workpiece.

To this end, a ring 31 is provided which has an inner surface 32 having approximately the same circumference as the chuck assembly 1. The ring is attached around the chuck assembly by various means described hereinafter. As shown in FIG. 2 the ring 31 has feet 33 which are located and positioned so that when the ring 31 is placed in position around the chuck assembly so feet 33 engage the upper surfaces of the hard jaws 2.

Various means can be provided for locating and retaining feet 33 on the ring 31 but in the arrangement shown bolts 39 are provided to be received and counter sunk holes in the feet to hold the feet in position.

FIG. 2 illustrates the arrangement which includes a hard jaw 2A in dotted lines showing foot 33A in engagement with the top surface of the hard jaw. Thus, with the ring in place, which typically engages the hard jaw at about mid stroke of the draw bar 10, and the soft jaw, attached to each hard jaw then the hard jaws are extended in the chuck assembly until all of the jaws engage the feet 33. At this point an established travel distance of the stroke of the draw bar is established to provide a positive rigid stop so that the soft jaws can be bored, turned or faced to a true point of positioning.

The soft jaw is then machined to receive the work piece 26.

In subsequent operations, where appropriate, it is only necessary to properly attach the soft jaws to the hard jaws. At this point concentricity is established within the soft jaws and a work piece can be machined to the proper dimensions.

FIG. 2 is an illustration of another feature within the scope of the present invention where counter bores 37 have been provided in alignment with bored and tapped holes 38 so that the ring can be assembled simply by securing the half 31A to the half 31B. A keyed locator slot and segment 35A, 35B is provided to asure proper alignment of the ring.

FIGS. 3 and 4 illustrate another arrangement also within the scope of the present invention where the ring member 51 is provided having half sections 51A, 51B, which are connected by means of a pivot 52. A bore 54 and a tapped bore 55 are provided on the opposite leg of the assembly so that the unit can be opened by means of the pivot and then secured by means of a bolt received in the bore. Also, locator slot and segment 56A, 56B can be provided.

In FIG. 3, feet 53 are provided to engage the upper surface of the hard jaws of the arrangement shown in FIG. 1 as previously described. It will be understood that the contact surface of the feet 53 of FIG. 3 and the feet 33A of FIG. 2 can be configured to provide the most efficient contact between the contact surface of the feet and the upper surface of the hard jaw.

It will be understood that the foregoing are but examples of arrangements within the scope of the present invention and that other arrangements also within the scope of the present invention will occur to those skilled in the art upon reading the disclosure set forth hereinbefore.

The invention claimed is:

1. In a lathe having a chuck assembly including a chuck body to be rotated and receive a work piece where said chuck body includes a central opening to receive the work piece therethrough, a plurality of hard jaws radially slidable in a plurality of jaw guides circumferentially spaced about said central opening; means for radially reciprocating said hard jaws with respect to said body toward and away from said chuck body opening where each said hard jaw has a radially outer surface and radially inner surface; a plurality of soft jaws attached to said hard jaws to move therewith where said soft jaws are adapted to securely engage said work piece; and a securing device including a ring member which is intimately received about the circumference of said body and including feet members rigidly affixed thereto and extending radially inwardly therefrom and in radial alignment with said outer surfaces of the hard jaws whereby the inner surface of said feet members engage said outer surface of said hard jaws so that the work engaging surfaces of the soft jaws can be machined to the configuration of the workpiece.

* * * * *